US005177359A

United States Patent [19]

Hiroki et al.

[11] Patent Number: 5,177,359

[45] Date of Patent: Jan. 5, 1993

[54] QUADRUPOLE MASS SPECTROMETER HAVING PLURAL STABLE REGIONS

[75] Inventors: Seiji Hiroki; Tetsuya Abe, both of Nakamachi; Koji Yanagishita, Chigasaki; Nobuhiko Tsuchiya, Hussa; Yoshio Murakami, Nakamachi, all of Japan

[73] Assignee: Japan Atomic Energy Research Institute, Tokyo, Japan

[21] Appl. No.: 781,507

[22] Filed: Oct. 22, 1991

[30] Foreign Application Priority Data

Oct. 22, 1990 [JP] Japan .................................. 2-283850

[51] Int. Cl.[5] .............................................. B01D 59/44

[52] U.S. Cl. .................................... 250/292; 250/290; 250/282

[58] Field of Search ............... 250/288, 282, 281, 290, 250/292

[56] References Cited

U.S. PATENT DOCUMENTS 3,784,814 1/1974 Sakai et al. .......................... 250/292
4,090,075 5/1978 Brinkman ............................ 250/282
4,650,999 3/1987 Fies, Jr. et al. ...................... 250/282
4,721,854 1/1988 Dawson .............................. 250/292
4,755,670 7/1988 Syka et al. .......................... 250/292

*Primary Examiner*—Jack I. Berman
*Assistant Examiner*—James Beyer
*Attorney, Agent, or Firm*—Carothers & Carothers

[57] ABSTRACT

In a quadrupole mass spectrometer which includes four parallel rod electrodes between opposite pairs of which overlapping voltages $\pm(U+V\cos\omega t)$ are applied (where U: a continuous voltage and $V\cos\omega t$: a radio-frequency voltage) and which effects mass-analysis by an electric field formed within the four parallel rod electrodes, at least one parameter of U, V and ω has two different values, and the values are changed over to select the first stable region or the second stable region, the first stable region being nearest to the original point and the second stable region being next near to the original point on the a - q plane (where a:ordinate, q:abscissa) showing "stability diagram", and the ions being able to pass through the four parallel electrodes under the conditions of the first and second stable regions, where the variable $a=8eU/mr_0^2\omega^2$, $q=4eV/mr_0^2\omega^2$, U: level of DC voltage, V: peak of the radio-frequency voltage, e: charge of ion, m:mass of ion, $r_0$: radius of an inscribed circle of the four parallel rod electrodes and ω: angular frequency of the radio frequency voltage.

5 Claims, 10 Drawing Sheets

QUADRUPOLE MASS SPECTROMETER HAVING PLURAL STABLE REGIONS

BACKGROUND OF THE INVENTION

1. Field of the Invention

This invention relates to a quadrupole mass spectrometer or quadrupole mass filter.

2. Description of the Prior Art

The quadrupole mass spectrometer generally, as shown in FIG. 1, consists of an ion source 1, a quadrupole electrode 2 and a detector 3 including secondary electron multiplier. The quadrupole electrode 2 is constituted by four parallel rod electrodes 2*a*, 2*b*, 2*c* and 2*d* ideally of hyperbolic cross section (often merely cylindrical). Between opposite pairs of the quadrupole rod electrodes 2*a*, 2*b*, 2*c* and 2*d* overlapping voltage, $\pm(U+V\cos\omega t)$ are applied as shown in FIG. 2. In the added (overlapping) voltage, a continuous voltage U or a direct current voltage U and high (radio) frequency voltage (V cos ωt) are added to each other. An electric field is generated in the electrodes 2*a*, 2*b*, 2*c* and 2*d* by the applied voltage. When the ions produced in the ion source 1 are introduced along the central axis (hereafter called "Z axis direction") into the quadrupole electrode 2, the ions receive forces in x axis direction and y axis direction along the z axis direction. And under certain conditions of voltages (U, V), the distance $2r_0$ between the opposite electrodes of the quadrupole electrode 2 and high frequency $f(\omega/2\pi)$, only ions having specific m/e (the ratio of mass to charge) vibrate with the limited amplitude in the x axis and y axis direction and can pass through the quadrupole electrode 2. The amplitudes of other ions having the other value m/e increase further. Accordingly, they are caught by the quadrupole rod electrode 2*a*, 2*b*, 2*c* or 2*d* or they pass through the spaces between the rod electrodes 2*a*, 2*b*, 2*c* and 2*d*. Thus, the other ions having the other value m/e can not reach the detector 3.

The ions passing though the quadrupole electrode 2 are detected by an ion collector or the secondary electron multiplier. A signal in level proportional to the ion currents is recorded by an oscilloscope, an electromagnetic oscillograph and a pen recorder. Thus, mass spectrum can be obtained.

Next, there will be described the theory of the quadrupole mass spectrometer in more detail. The potential φ fulfilling the following equation (1-1) is formed in the quadrupole rod electrodes 2*a*, 2*b*, 2*c* and 2*d*: The potential φ follows the Poisson's law. Accordingly, it fulfills the equation (1-2):

$$\phi=\phi_0(\lambda x^2+\sigma y^2+\gamma z^2) \qquad (1\text{-}1)$$

(where λ, σ and γ are constant.)

$$\nabla^2\phi=\left\{\frac{\partial^2\phi}{\partial x^2}+\frac{\partial^2\phi}{\partial y^2}+\frac{\partial^2\phi}{\partial z^2}\right\}=0 \qquad (1\text{-}2)$$

From the equations (1-1), 1-2), the following equation (1-3) can be easily obtained:

$$\lambda+\sigma+\gamma=0 \qquad (1\text{-}3)$$

In the quadrupole mass spectrometer, these constants λ, σ and γ are selected as shown in the following equation (1-4).

$$\lambda=-\sigma=\frac{1}{r_0^2},\ \gamma=0 \qquad (1\text{-}4)$$

Accordingly, the equation (1-1) can be expressed as shown in the following equation (1-5):

$$\phi=\frac{\phi_0}{r_0^2}(x^2-y^2) \qquad (1\text{-}5)$$

The shape of the cross section of the rod electrodes forming the above potential φ is of rectangular hyperbola. It is characterized in a quadrupole mass spectrometer. As shown in FIG. 2, the added or overlapping voltage $\pm(U+V\cos\omega t)$ is applied to the rod electrodes 2*a*, 2*b*, 2*c* and 2*d*. Thus, the potential represented by the following equation (1-6) is formed in the quadrupole electrode 2.

$$\phi=(U+V\cos\omega t)\frac{(x^2-y^2)}{r_0^2} \qquad (1\text{-}6)$$

The potential gradient or the electric field in the quadrupole electrode 2 can be represented by the following equation (1-7):

$$\left.\begin{aligned}Ex&=-\frac{\partial\phi}{\partial x}=-(U+V\cos\omega t)\frac{2x}{r_0^2}\\ Ey&=-\frac{\partial\phi}{\partial y}=(U+V\cos\omega t)\frac{2y}{r_0^2}\\ Ez&=-\frac{\partial\phi}{\partial z}=0\end{aligned}\right\} \qquad (1\text{-}7)$$

The equation of motion of the ion passing through the above described electric field is expressed by the following equation (1-8).

$$\left.\begin{aligned}&m\frac{d^2x}{dt^2}+2e(U+V\cos\omega t)\frac{x}{r_0^2}=0\\ &m\frac{d^2y}{dt^2}-2e(U+V\cos\omega t)\frac{y}{r_0^2}=0\\ &m\frac{d^2z}{dt^2}=0\end{aligned}\right\} \qquad (1\text{-}8)$$

Next, there will be considered motions of the ion. The motions in x axis direction and y axis direction can be independently handled. The ions receive periodical forces in x axis direction and y axis direction. Thus, the ions vibrate in the x axis direction and y axis direction. They receive no force in the z axis direction. Accordingly, they move at the same rate as initial velocity in the Z axis direction. When the equation (1-8) is substituted for the equation (1-9), the differential equation (1-10) which is known as the Mathieu's equation, can be obtained:

$$\omega t=2\xi,\ a=\frac{8eU}{mr_0^2\omega^2},\ q=\frac{4eV}{mr_0^2\omega^2} \qquad (1\text{-}9)$$

-continued $$\left.\begin{aligned} \frac{d^2x}{d\xi^2} + (a + 2q\cos 2\xi)x = 0 \\ \frac{d^2y}{d\xi^2} - (a + 2q\cos 2\xi)y = 0 \end{aligned}\right\} \quad (1\text{-}10)$$

The motion of the ion in the electric field formed by the quadrupole rod electrodes can be obtained by the solution of the above equation. The solution consists of a stable solution and a unstable solution.

In the stable solution, the ions can take the stable orbit within a predetermined amplitude for an indefinite time. In the unstable solution,the amplitude of the motion of the ions indefinitely increases with time. The relationship between an and q for giving the stable solutions can be shown in the (a, q) plane. It is shown in FIG. 3. The regions for the stable solution of the x axis direction and y axis direction in the electric field of the quadrupole electrode 2 are symmetrical with respect to the original point as shown in FIG. 3. The hatched portions correspond to the region for the stable solution and the white (non-hatched) portion correspond to the region for the unstable solution. In order that the ion can pass through the electric field of the quadrupole electrode 2, the amplitude of the motion of the ions in the x axis direction and y axis direction should be limited within a certain value. This fact means that the stable region for x axis direction and the stable region for y axis direction should overlap with each other. In a practical quadrupole mass spectrometer, the stable region nearest to the original point is utilized from a practical view point. The stable region is enlargedly shown in FIG. 7. It is called "stability diagram".

One point on the (a.q) plane corresponds to the ion having the predetermined mass when the values of $r_0$, $\omega$ and the voltages U and V are determined. The relationship a/2q=U/V is obtained from the equation (1-9). Thus, the line passes through the original point on the (a,q) plane and it has the gradient which is determined by a ratio of U to V. It has no relationship with a mass number. When the ratio U/V is determined, the ions having the different masses are aligned on the line. Such a line is called "mass scan line". Only the ions having the mass on the line portion in the stable region, as through the electric field of the quadrupole rod electrodes 2*a*, 2*b*, 2*c*, and 2*d*. The ions in the y stable region and x unstable region out of the xy stable region on the line have a larger mass than the ions in the xy stable region. Such ions in x axis direction are unstable in motion and so they are captured by the one of the quadrupole rod electrodes 2*c*, 2*d* on x axis. The other hand, the ions in the x stable region and the y unstable region out of the xy stable region have smaller mass than the ions in the xy stable region. Such ions are unstable in motion in axis direction and it is captured by the one of the quadruple rod electrodes 2*a*, 2*b* in the y axis direction.

In the above-mentioned manner, the ion mass can be analyzed. However, when the above described quadrupole mass spectrometer is used, the ratio of U/V is varied in order to adjust the resolution-power. The more the ratio of U/V is enlarged, the gradient of mass scan line in FIG. 7 is steeper. At last, the mass scan line passes through a Q point which is a top point of the xy stable region. However, the mass scan line passing through the point near the top point Q has a higher resolution-power.

Next, there will be described the above-mentioned fact with respect to FIG. 4. From the mass scan line with a relatively small ratio of U/V, a spectrum shown in FIG. 4A can be obtained. At both sides of the ion having the mass which correspond to the point a, the peaks of the ions b, c can be found, which have larger and smaller masses respectively than the mass corresponding to the point a. However, such spectrum can be distinguished differently from each other only by the degree of observer's skill. Some person may read this spectrum as only an ion having the mass a. In order to improve the resolution-power more, the ratio of U/V should be increased and so the U value is adjusted. Accordingly, the spectrum as shown in FIG. 4B can be obtained. When the ratio of U/V. is increased further for high resolution-power, a spectrum as shown in FIG. 4C can be obtained.

However, even when a high resolution-power is set, it varies daily with a thermal drift or reliability of the circuit parts in the circuit constructions. Accordingly, whenever the same mass spectrometer is used, subtle adjustment should be made. Thus, the reproducibility is difficult to be obtained for the same mass spectrometer.

SUMMARY OF THE INVENTION

Accordingly, it is an object to provide a quadrupole type mass spectrometer which is stable and very reproducible in simple operation, even when a high resolution-power is set, and by which high resolution-power can be securely obtained.

In accordance with an aspect of this invention, in a quadrupole mass spectrometer which includes four parallel rod electrodes between opposite pairs of which overlapping voltages$\pm$(U+V cos $\omega$t) are applied (where U: a continuous voltage and V cos$\omega$t:a radio-frequency voltage) and which effects mass-analysis by an electric field formed within said four parallel rod electrodes, the improvements in which at least one of parameters U, V and$\omega$ has three different values, and said values are changed over to one of said three different values to select the first stable region the second stable region or the third stable region, said first stable region being nearest to the original point, said second stable region being secondly nearest to said original point and said third stable region being thirdly nearest to said original point on the a - q plane (where a :ordinate, q abscissa) showing "stability diagram", and the ions being able to pass through the four parallel electrodes under the conditions of the first, second and third stable regions, where the variable $a=8eU/mr_0^2\omega^2$, $q=4eV/mr_0^2\omega^2$, U: level of DC voltage, V: peak of said radio-frequency voltage, e: charge of ion, m: mass of ion, r°: radius of an inscribed circle of said four parallel rod electrodes and $\omega$: angular frequency of said radio frequency voltage.

In another aspect of the invention, in a quadrupole mass spectrometer which includes four parallel rod electrodes between opposite pairs of which overlapping voltages$\pm$(U+V cos $\omega$t) are applied (where U: a continuous voltage and V cos$\omega$ t:a radio-frequency voltage) and which effects mass-analysis by an electric field formed within said four parallel rod electrodes, the improvements in which at least one of parameter U, V and $\omega$ has two different values, and said values are changed over to select the first stable region or the second stable region, said first stable region being nearest to the original point and said second stable region being next near to said original point on the a - q plane (where a :ordinate, q:abscissa) showing "stability diagram", and the ions being able to pass through the four parallel electrodes under the conditions of the first and second stable regions, where the variables $a=-8eU/mr_0^2\omega^2$, $q=4eV/mr_0^2\omega^2$, U: level of DC voltage, V: peak of said radio-frequency voltage, e: charge of ion, m: mass of ion, $r_0$: radius of an inscribed circle of the four parallel rod electrodes and ω: angular frequency of said radio frequency voltage.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
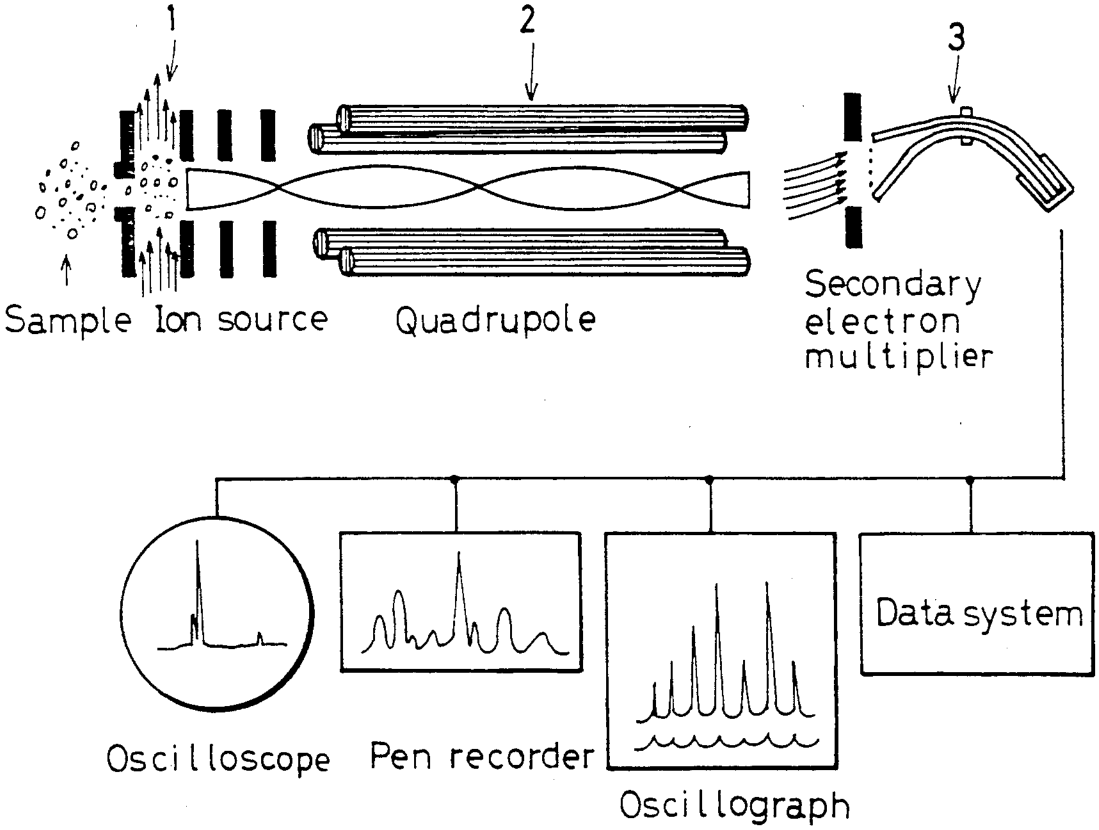
FIG. 1 Prior Art
FIG. 1 is a schematic side view of a prior art quadrupole type mass spectrometer.
Figure 2:
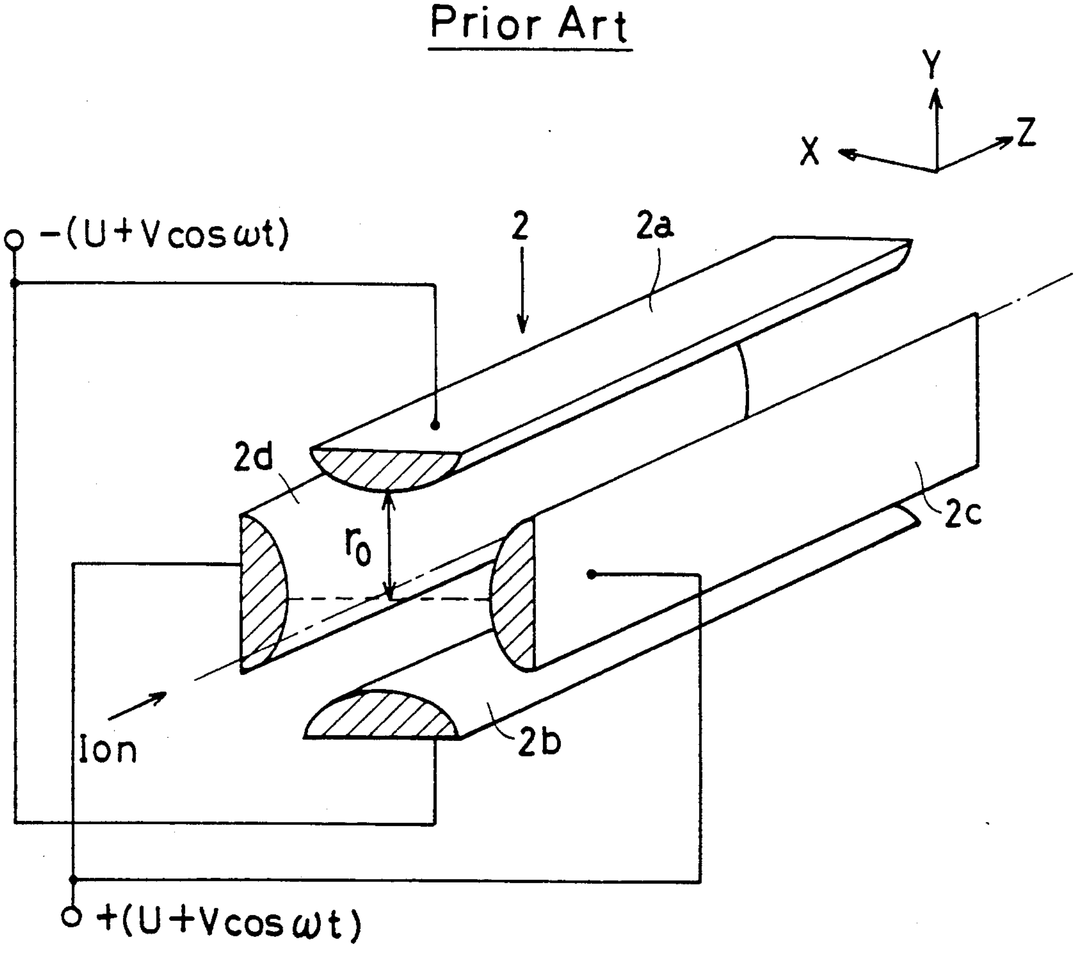
FIG. 2 Prior Art
FIG. 2 is a perspective view for explaining the detail of the quadrupole type mass spectrometer.
Figure 3:
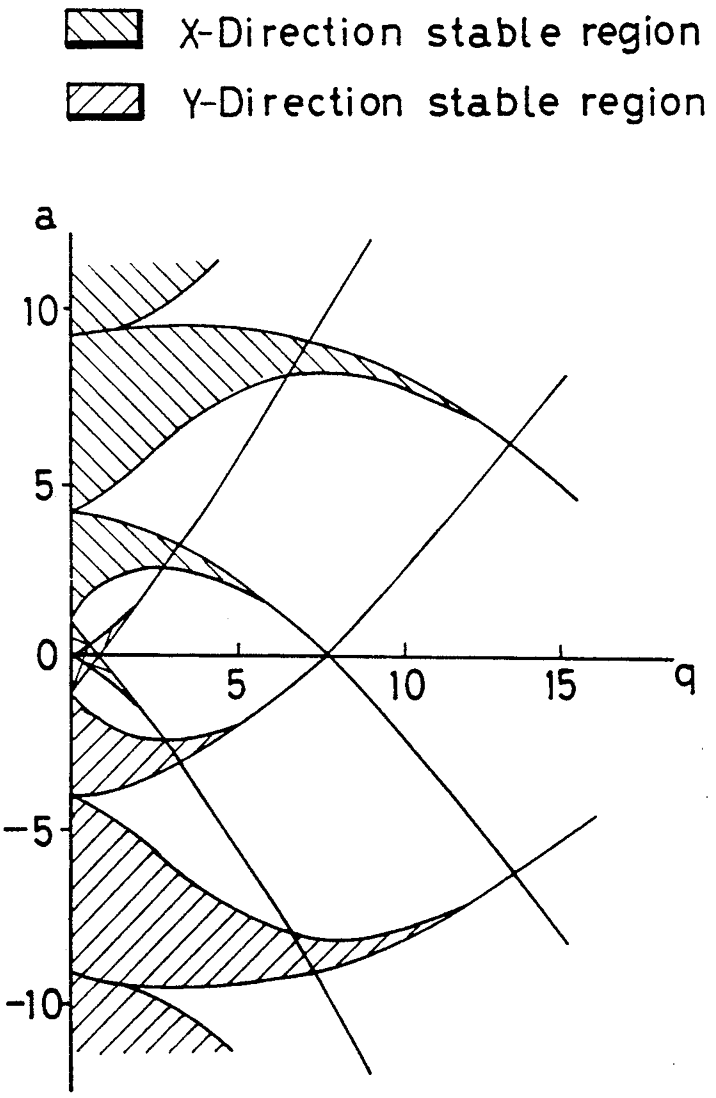
FIG. 3 Prior Art
FIG. 3 is a graph showing regions of the stable solution of the Mathieu's equation for explaining the operation of the prior art.
Figure 4C:
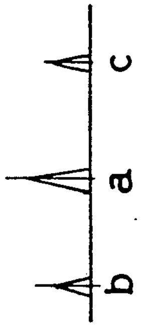
FIG. 4C Prior Art
FIGS. 4A–4C are analyzed spectrums for explaining the operation of the prior art.
Figure 4B:
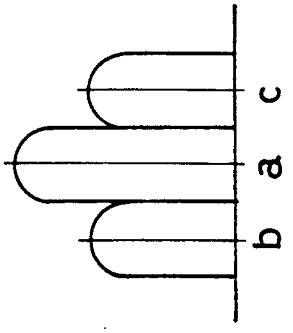
FIG. 4B Prior Art
Figure 4A:
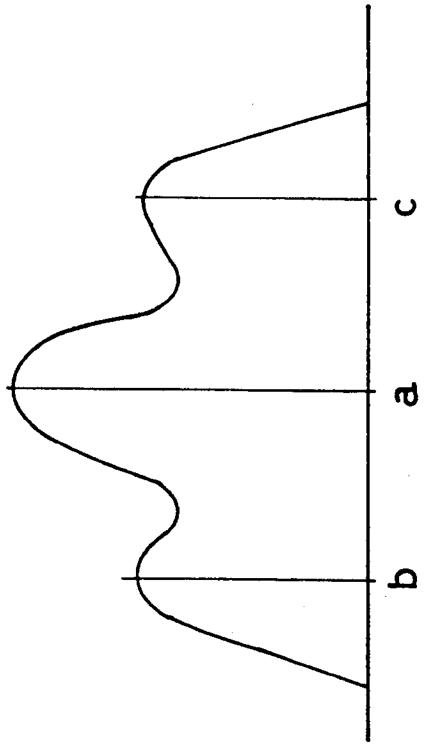
FIG. 4A Prior Art
Figure 5:
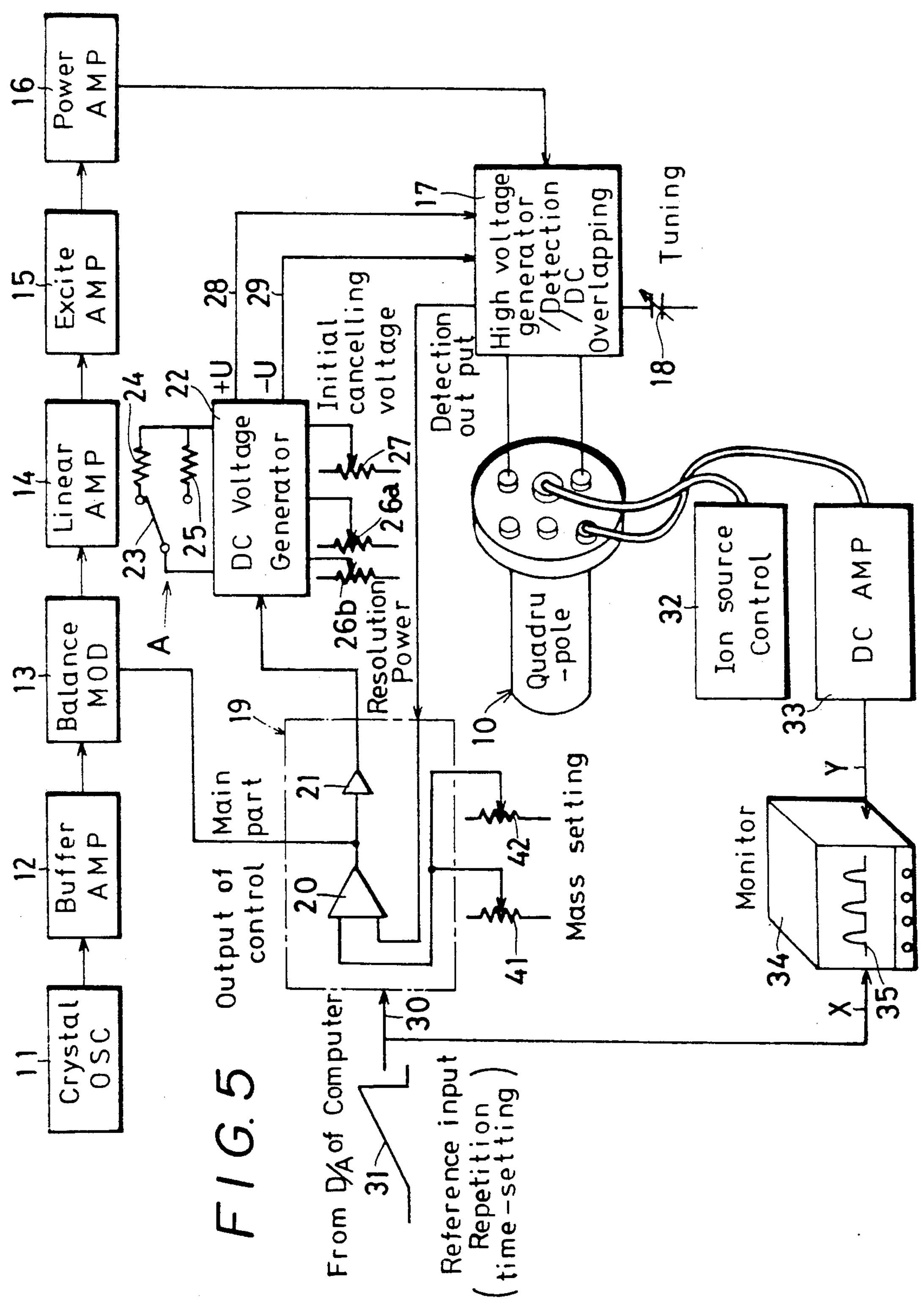
FIG. 5 is a block diagram of a high frequency power source part and of a direct current power source part in a quadrupole type mass spectrometer according to one embodiment of this invention.

The size of a body 10 of the quadrupole type mass spectrometer in FIG. 5 is as small as a handy-sized can or a home thermos. Inside of it, the pairs of the rod electrodes 2*a*, 2*b* and 2*c*, 2*d* are arranged in parallel with each other as shown in FIG. 1 and FIG. 2. The rod electrodes 2*a*, 2*b* and 2*c*, 2*d* are electrically connected with each other and the mixed voltage $\pm(U+V\cos\omega t)$ are applied to the pairs, in which is added the direct current voltage U and the high (radio) frequency voltage, $V\cos\omega t$ to each other.

According to this embodiment, a crystal osciliator 11 generates a signal of high frequency of 2.5 MHz. Its output is supplied to a buffer amplifier 12 and it is connected through a balanced modulator 13, a linear amplifier 14, an exciter amplifier 15 and a power amplifier 16 to a high voltage generator part/detector part/D.C. overlapping part - circuit 17. In order to match the body 10, a variable capacitor 18 is connected to the circuit 17 which receives the high frequency voltage of 2.0 MHz from the power amplifier 16. Accordingly, it is synchronized with a variable capacity 18.

A part of the high frequency voltage supplied from the power amplifier 16 is rectified in the high voltage generator part/detector part/D.C. current overlapping part - circuit 17. The detected output from it is supplied to a comparator 20 of a main control part 19. Thus, a closed loop is constituted for the high frequency power source. A stable high frequency voltage can be supplied to the quadrupole type mass spectrometer body 10. A saw-tooth wave 31 as shown in FIG. 5 is supplied as a reference input to the main control part 19 through a digital - analog (D/A) converter of a personal computer, although not shown, in order to set the repetition time. A mass number range to be analyzed is digitally set in the personal computer.

The saw-tooth wave 31 is amplified by a D.C. amplifier 21 connected to the comparator 20 in the main control part 19 and it is supplied to a D.C. voltage generator 22. A change-over circuit A according to this invention is connected to the main control part 19. A movable contact 23 is changed over to a first resistor 24 side or to a second resistor 25 side. Thus, the first stable region or the second stable region can be selected.

Further, variable resistors 26*a*, 26*b* for adjusting resolution-powers are connected to the D.C. voltage generator 22. The variable resistors 26*a*, 26*b* are used for the first region and the second region, respectively.

When the movable contact 23 is changed over to the resistor 24, the resolution-power for the first stable region is adjusted by the variable resistor 26*a*. When the movable contact 23 is changed over to the resistor 25, the resolution-power for the second stable region is adjusted by the variable resistor 26*b*. Thus, the gradient of the mass scan line is adjusted in the first and second stable regions, respectively. The above mentioned D.C. voltages +U and −U are supplied through electric wires 28 and 29 to the high voltage generator part/detector part/D.C. overlapping part - circuit 17 from the D.C. voltage generator 22. The high frequency voltage from the power amplifier 16 and the D.C. voltages +U and −U are added to each other in the D.C. overlapping part of the high voltage generator part/detector part/D.C. overlapping part - circuit 17. The mixed voltages in which the D.C. voltages +U and −U are applied to the high frequency voltage $V\cos\omega t$, are applied to the rod electrodes 2*a*, 2*b* and 2*c*, 2*d* contained in the quadrupole mass spectrometer body 10.

An ion source control part 32 is connected to the quadrupole mass spectrometer body 10. It controls the ion source 1 shown in FIG. 1. The result of the analyzed output of the quadrupole mass spectrometer body 10 is supplied to a small-current amplifier 33 (D.C. Amp) of the ion current. The output of the amplifier 33 is supplied to a monitor 34. Further, the saw-tooth wave 31 from the personal computer (not shown) is supplied to the monitor 34.

The quadrupole mass spectrometer body 10 is often used under a super high vacuum condition. When the ion current is very small under the super high vacuum condition, it is difficult to detect such a small ion current. Accordingly, the secondary electron multiplier is arranged in the quadrupole mass spectrometer body 10. And the high voltage generator part of the high voltage generator part/detector part/D.C. overlapping part - circuit 17 generates a supply voltage for it.

A variable resistor 27 for adjusting a initial cancelling voltage is connected to the D.C. voltage generator part 22. It is used exclusively for the second stable region. When the second stable region is selected or when the movable contact 23 is changed over to the resistor 25 side in the change over circuit A, the variable resistor 27 for adjusting the initial cancelling voltage is adjusted. Thus when the mass scan line is scanned in the second stable region and the voltage is very small, the occurrence of the mass spectrum in the first stable region is prevented by the adjustment 14. When the quadrupole mass spectrometer is operated for the first stable region, it is not used.

Variable resistors 41, 42 for setting arbitrary masses are connected to the main control part 19 and they determine a reference potential for the comparator 20 in the main control part 19. Thus, they are adjustable resistors for stable operation of the quadrupole mass spectrometer.

Next, there will be operation of the above described quadrupole mass spectrometer.

First, the case that the masses are measured within a wide range, will be described. In this case, the movable contact 23 is changed over to the resistor 24 side in the D.C. voltage generator 22.

Accordingly, the D.C. voltages +U and −U in accordance with the resistance of the resistor 24 are supplied through the electric wires 28 and 29 to the high voltage generator part/detector part/D.C. overlapping part - circuit 17. On the other hand, the high frequency signal d from the crystal oscillator 11 is supplied through the buffer amplifier 12, the balanced modulator 13, linear amplifier 14 and exciter amplifier 15 and power amplifier 16 to the high voltage generator part/detector part/D.C. overlapping part - circuit 17. It is amplified in a predetermined level and power and supplied to the circuit 17. The detected output from the circuit 17 is fed back through the main control part 19 to the balanced modulator 13. On the other hand, the reference input as a carrier wave is supplied to the balanced modulator 13. The modulated signal from the balanced modulator 13 is supplied through the linear amplifier 14, exciter amplifier 15 and the power amplifier 16 to the high voltage generating part/detector part/D.C. overlapping part - circuit 17. Thus, a stable high frequency voltage for scanning mass is obtained. The ratio of +U, −U from the D.C. voltage generator 22, to the high frequency voltage $V \cos \omega t$ constitutes the parameter for scanning the first stable region. Thus, the ions within the wide mass range can be analyzed.

The ion current is amplified by the small-current amplifier 33 and it is supplied to the monitor 34. On the other hand, the saw-tooth wave 31 is supplied from the personal computer to the monitor 34. It is used as time base signal and so the ions are shown as a spectrum in a display 35 of the monitor 34. The mass of the ions can be analyzed with the display 35. In the initial stage of the analysis operation, the variable resistor 26a is adjusted in the D.C. voltage generator 22 and so the gradient of the mass scanning line in the first stable resolution-power.

Next, the case that the ions within narrow mass range are analyzed, will be described. For example, ions having smaller mass number than 4 such as hydrogen ion, heavy hydrogen ion, helium ion are analyzed. In this case, the movable contact 23 is changed over to the resistor 25 in the D.C. voltage generator 22. Thus, higher D.C. voltages +U and −U than in the case of the first stable region scanning can be obtained in the high voltage generator part/detector part/D.C. overlapping part - circuit 17. The same high frequency voltage as in the case of the first stable region scanning from the power amplifier 16 is supplied to the circuit 17. The above described D.C. voltages +U and −U are added to the high frequency voltage in the circuit 17 and it is supplied to the quadrupole mass spectrometer body 10.

In this case, the ratio of U/V becomes bigger than the one in the case of scanning the first stable region. In other words, the gradient of the mass scan line becomes larger and so the second stable region can be scanned.

Figure 6:
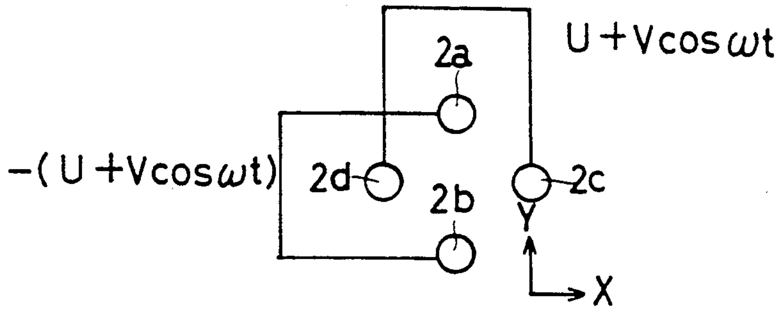
FIG. 6 is a graph for explaining operations of the quadrupole type mass spectrometer of this embodiment in the first stable region and second stable region of the (a,q) plane.
Figure 6:
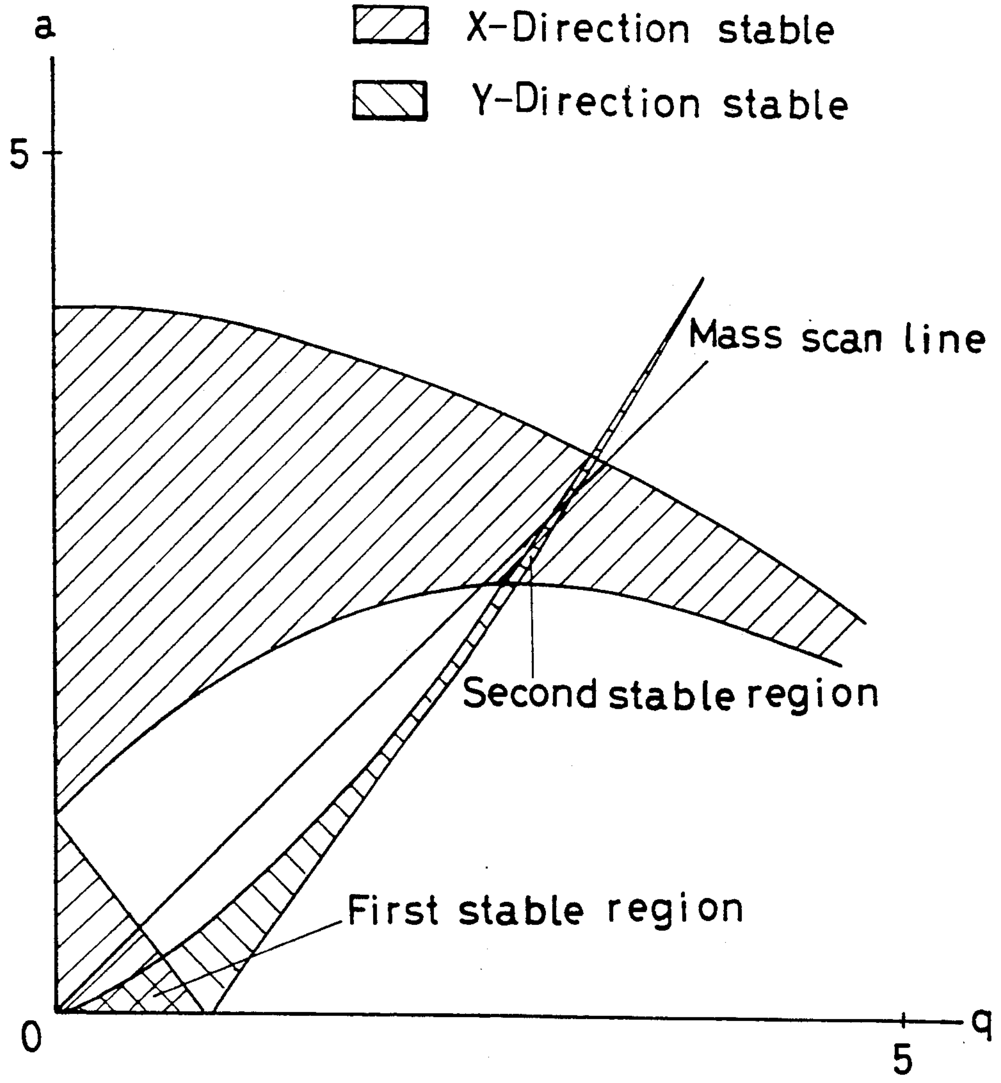
Figure 7:
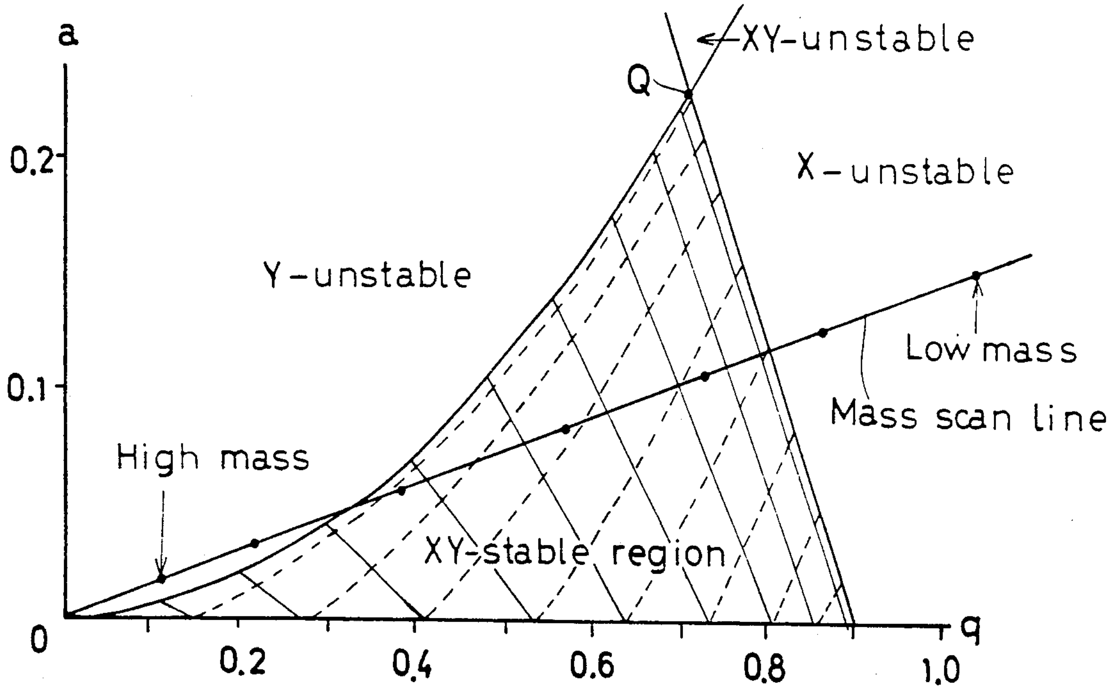
FIG. 7 is an enlarged graph for explaining the detail of the first stable region in FIG. 6.

Accordingly, as shown in FIG. 6, the second stable region is very narrow and generally the gradient of the mass scan line is steeper stable region. For example, masses of helium and heavy hydrogen are very near to each other. However, even in the case, they can be analyzed at high resolution-power. The spectrum of He and D can be distinctly displayed in the monitor 34.

As above described, when the normal mass analysis or the mass analysis within the wide mass range is made, the movable contact 23 is changed over to the resistor 24 side to use the first stable region. And when the mass analysis within the narrow mass range or the high resolution analysis of the low masses within the narrow range is made, the movable contact 23 is changed over to the resistor 25 side to use the second stable region. Accordingly, any ions can be accurately and securely analyzed by any operator who is not so skillful in mass-spectrum analysis. Further, the analysis is reproducible and stable over the wide range of the mass numbers of the ions.

Figure 8:
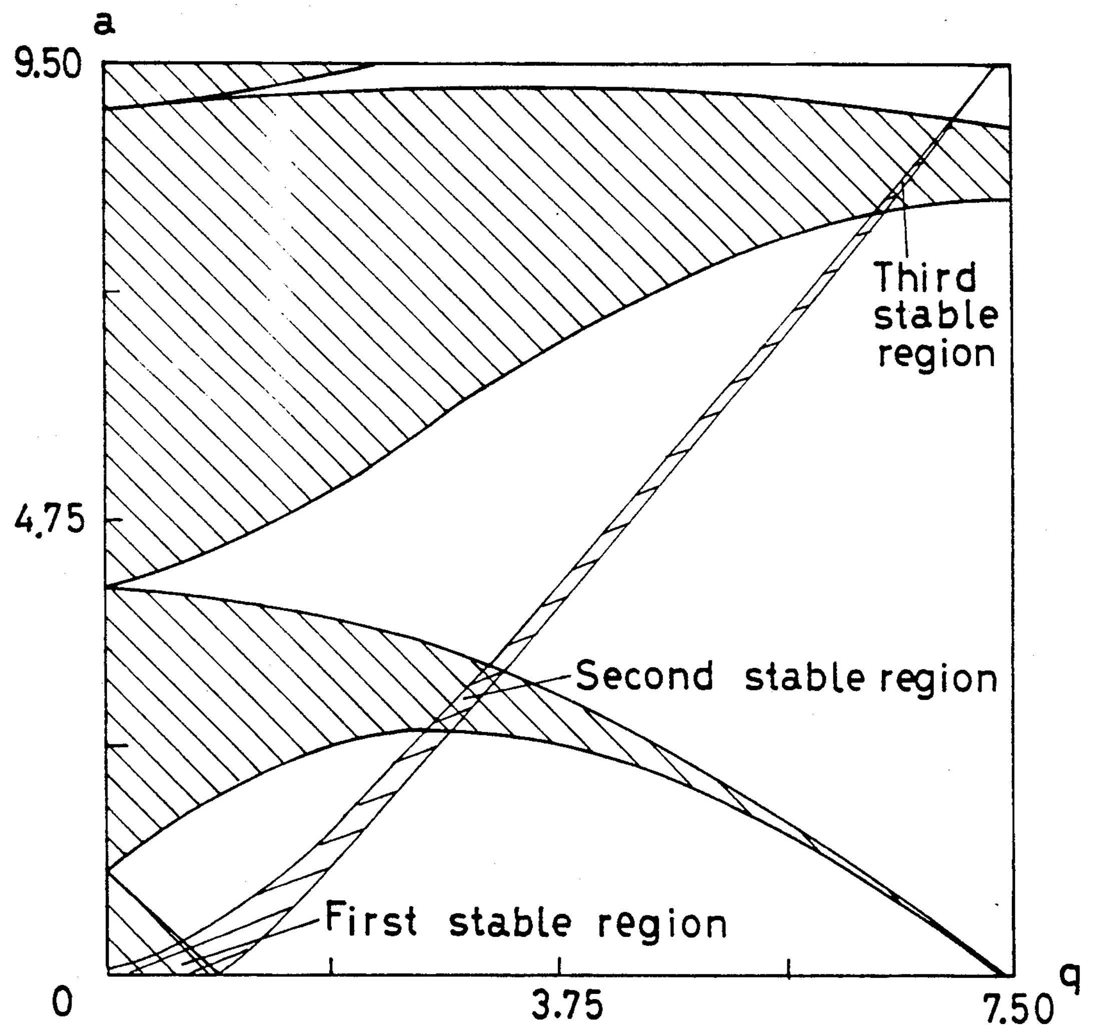
FIG. 8 is a graph for explaining operations of a quadrupole type mass spectrometer of another embodiment of this invention in the first, second and third stable region.

FIG. 8 shows the first, second and third stable regions. The third stable region is narrow in comparison with the first and second stable regions. However, ions with lower masses can be securely and distinctly separated from each other in the third stable region.

In a second embodiment of this invention, the parameter of the DC voltage (U, −U) has three different values and it is changed over into one of them so that the measure is made in the first, second or third stable region.

Figure 9:
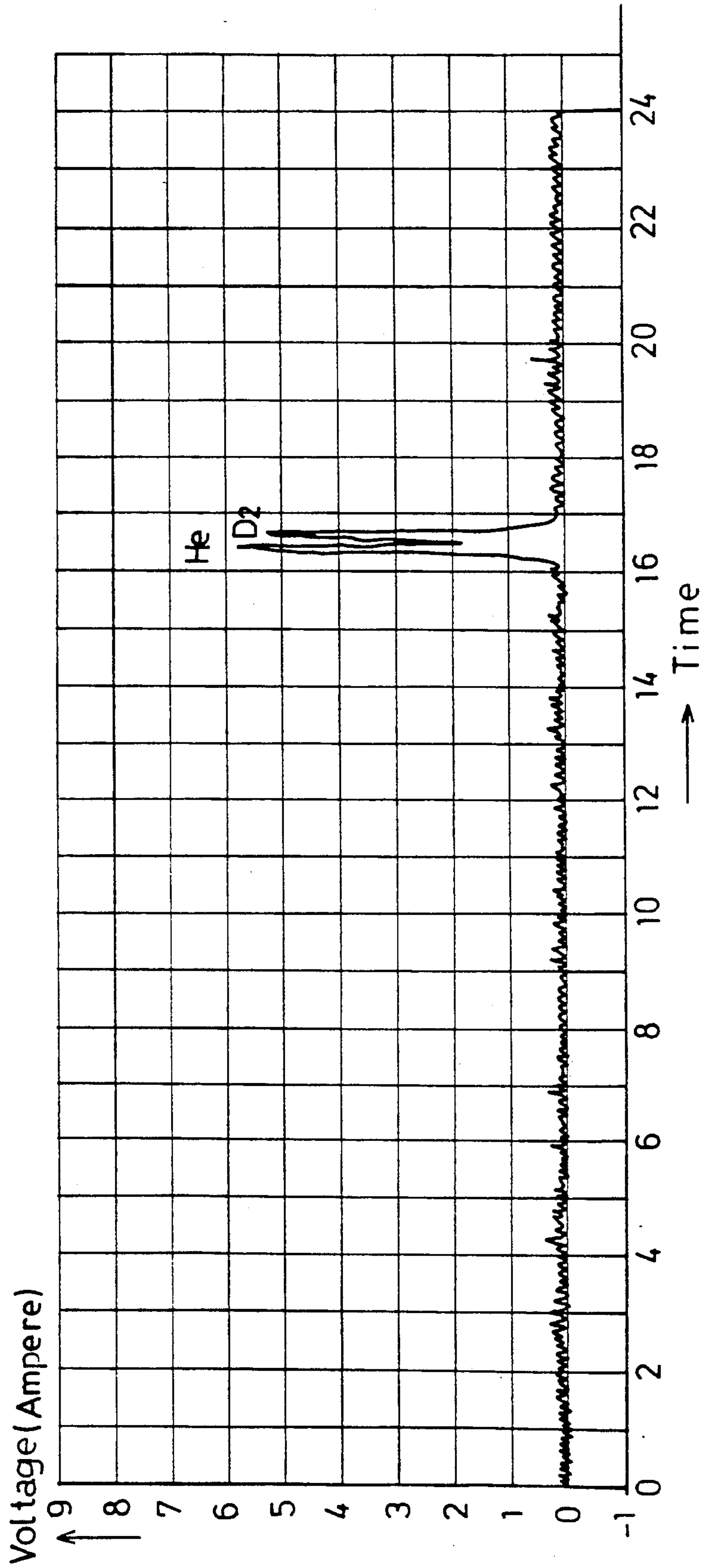
FIG. 9 and FIG. 10 are charts showing the experimental data of the quadrupole type mass spectrometer of the above embodiment in the second stable region.
Figure 10:
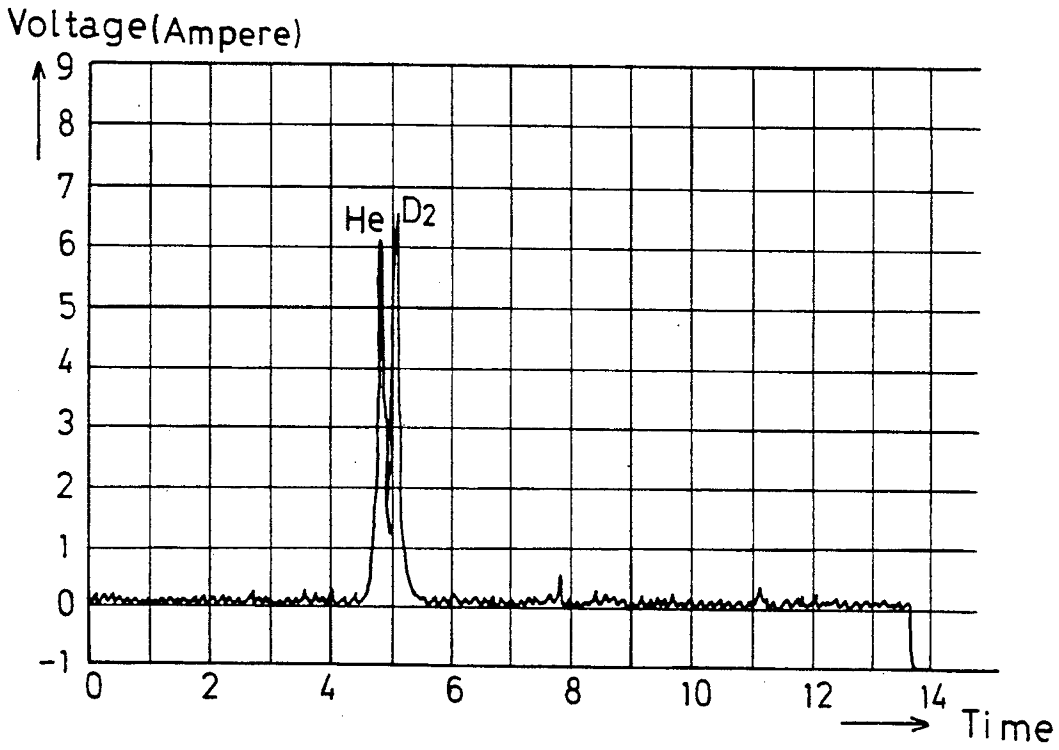

FIG. 9 and FIG. 10 show the experimental data. $D_2$ and He ions were analyzed in the second stable region. The mass numbers of $D_2$ and He are 4.029 amu and 4.004 amu, respectively. Accordingly, the difference $\Delta m$ is equal to 0.025 amu. The experimental conditions were in the vacuum pressure of $1.5\times10^{-6}$ Torr ($D_2$+He), the amplifier rate of $10^{-9}$ AFS (Ampere per fullscale:$10^{-9}$A) and SEM (secondary electron multiplier) of 7.3 (in scale of 0 to 10 and at applied voltage of −2.5KV). The abscissa time (1DV=1sec) in FIG. 9 and FIG. 10 is proportional to the mass number.

The spectrum of He and $D_2$ are distinctly separated from each other both in FIG. 9 and in FIG. 10. The measure of FIG. 10 was made in a short time after the measure of FIG. 9 was made and the electric power source was disconnected from the quadrupole mass spectrometer. The reproducibility of the spectrum separation is good as shown in FIG. 9 and FIG. 10.

While the preferred embodiment has been described, variations thereto will occur to those skilled in the art within the scope of the present inventive concepts which are delineated by the following claims.

In the above first embodiment, the magnitude of the DC voltage (U, −U) is changed over to select the first stable region or the second stable region. Instead, the frequency of the high frequency voltage (2.5 MHZ in the above embodiment) or the peak voltage V thereof has two different values. and the two different values may be changed over to each other for changing the gradient of the mass scan line in order that the first stable region is changed over to the second stable region or the second stable region is changed over to the first stable region.

What is claimed is:

1. In an apparatus for mass analysis by a quadrupole mass spectrometer which includes four parallel rod electrodes between opposite pairs of which overlapping voltages $\pm(U+V \cos \omega t)$ are applied. where U is a continuous voltage and V $\cos\omega t$ is a radio-frequency voltage, and which effects mass-analysis by an electric field formed within said four parallel rod electrodes, the improvements in which at least one of parameters U and V has three different non-zero values. and said one parameter is selectively changed to one of said three different values to select the corresponding one of three stable regions including a first stable region which is nearest to an original point that is the point of intersection of an ordinate a and an abscissa q a stability diagram illustrating said plural stable regions. a second stable region which is secondly nearest to said original point. and a third stable region which is thirdly nearest to said original point. and ions being able to pass through the four parallel electrodes under the conditions of said first. second and third stable regions. in said stability diagram where the variable $a=8eU/mr_0^2\omega^2$, $q=4eV/mr_0^2\omega^2$, U being the level of DC voltage. V being the peak of said radio-frequency voltage. e being the charge of ion. m being the mass of ion. $r_0$ being the radius of an inscribed circle of the four parallel rod electrode sand ω being the frequency of said radio frequency voltage. and a first mass scan line for analyzing large masses passes through said first stable region. the gradient of which is determined by a first one of said three different values, a second mass scan line for analyzing small masses passes through said second stable region. the gradient of which is determined by a second one of said three different values. and a third mass scan line for analyzing smaller masses passes through said third stable region, the gradient of which is determined by a third one of said three different values.

2. The improvement in an apparatus for mass analysis by a quadrupole mass spectrometer according to claim 1 in which elements He and $D_2$ are analyzed in said second or third stable region.

3. In an apparatus for mass analysis by a quadrupole mass spectrometer which includes four parallel rod electrodes between opposite paris of which overlapping voltages $\pm(U+V \cos\omega t)$ are applied. where U is a continuous voltage and V $\cos\omega t$ is a radio-frequency voltage. and which effects mass-analysis by an electric field formed within said four parallel rod electrodes, the improvements in which at least one of parameters U and V has two different non-zero values and said one parameter is selectively changed to one of said different two values to select one of a pair of stable regions including a first stable region which is nearest to an original point that is the point of intersection of an ordinate a and an abscissa q of a stability diagram illustrating said pair of stable regions, and a second stable region which is next nearest to said original point, and ions being able to pass through the four parallel electrodes under the conditions of the first and second stable regions in said stability diagram. where the variables $a=8eU/mr_0^2\omega^2$, $q=4eV/mr_0^2\omega^2$. U being the level of DC voltage. V being the peak of the radio-frequency voltage. e being the charge of ion. m being the mass of ion. r being the radius of an inscribed circle of the four parallel rod electrodes and ω being the angular frequency of said radio frequency voltage. and a first mass scan line for analyzing larger masses passes through said first stable region. the gradient of which is determined by one of said two different values. and a second mass scan line for analyzing smaller masses passes through said second stable region. the gradient of which is determined by the other of said two different values.

4. The improvement in an apparatus for mass analysis by a quadrupole mass spectrometer according to claim 3, in which the parameter U has two different values and said two different values are selected by a changeover switch which is included in a DC voltage generator for generating DC voltage U.

5. The improvement in an apparatus for mass analysis by a quadrupole mass spectrometer according to claim 4, which elements He and $D_2$ are analyzed in said second stable region.

* * * * *